Dec. 4, 1928.
A. T. DAWSON ET AL
1,693,692
GUN MOUNTING AND TRAVELING CARRIAGE THEREFOR
Filed Aug. 9, 1927      4 Sheets-Sheet 1
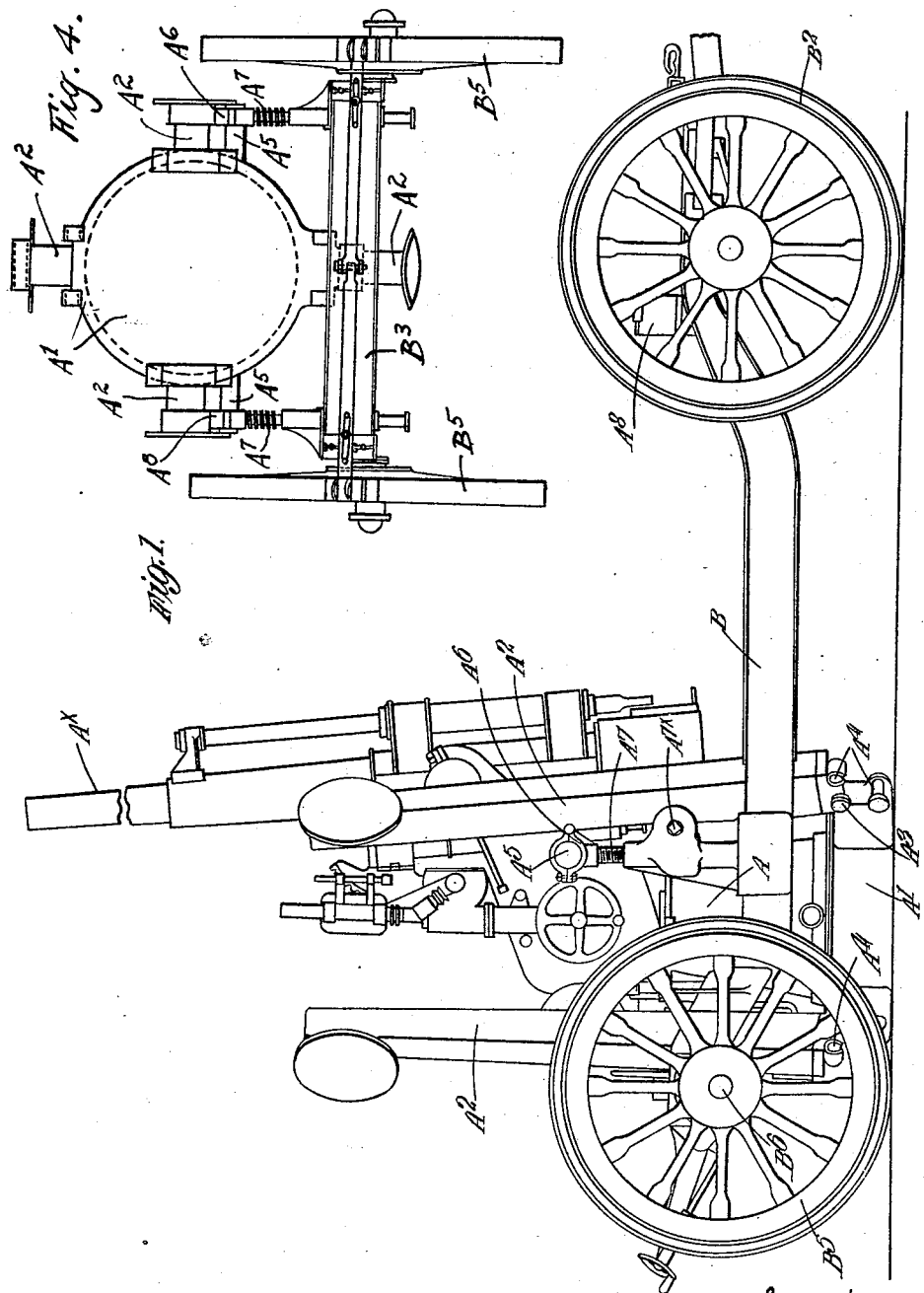

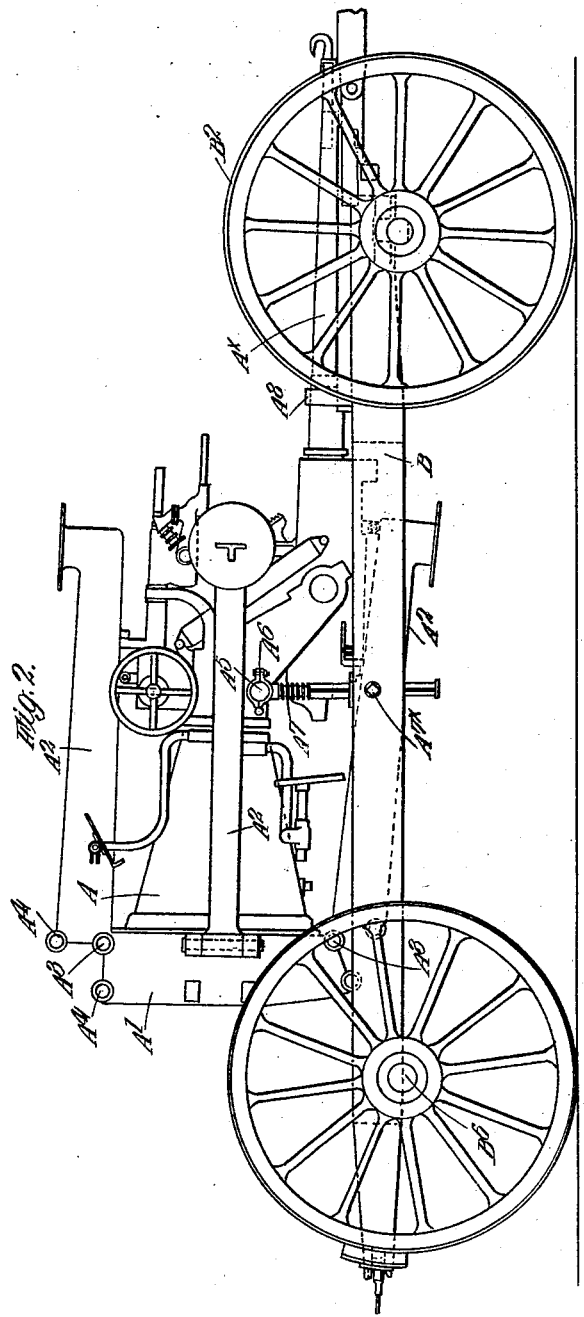

Dec. 4, 1928. 1,693,692
A. T. DAWSON ET AL
GUN MOUNTING AND TRAVELING CARRIAGE THEREFOR
Filed Aug. 9, 1927 4 Sheets-Sheet 3
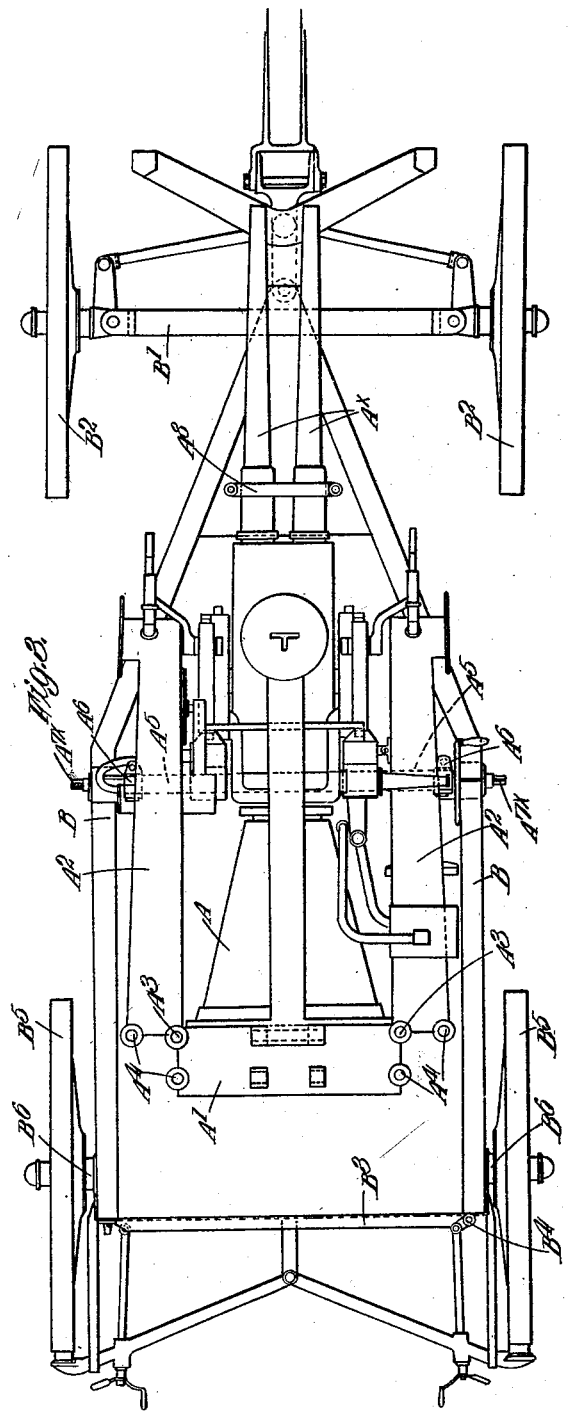

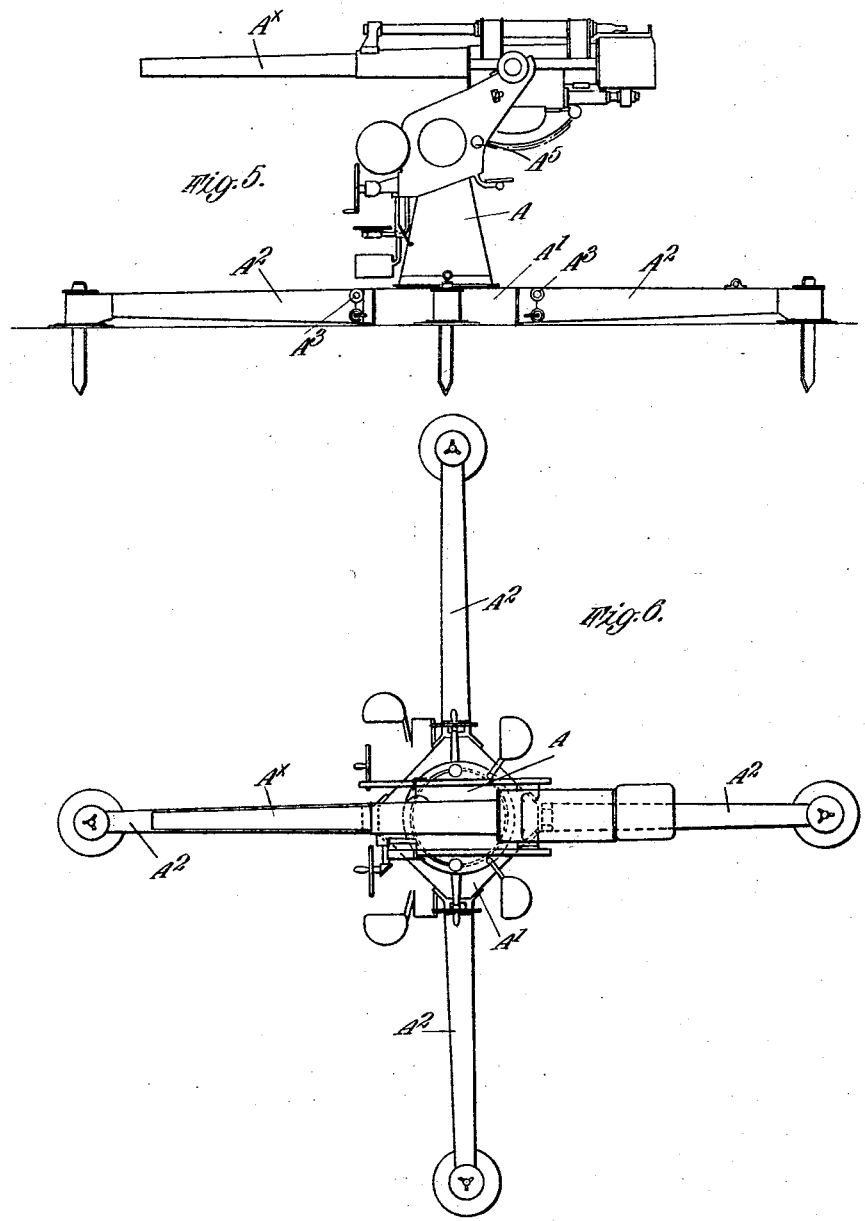

Patented Dec. 4, 1928.

1,693,692

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF LONDON, ENGLAND.

GUN MOUNTING AND TRAVELING CARRIAGE THEREFOR.

Application filed August 9, 1927, Serial No. 211,735, and in Great Britain August 31, 1926.

This invention relates to gun mountings of the pedestal or similar type and to traveling carriages for transporting such gun mountings from place to place.

According to the invention the gun mounting is provided at or near the centre of gravity of the mounting as a whole (including the gun or guns with the latter in a predetermined position of elevation) with pivot pins or trunnions which are adapted to co-operate with lifting means on the frame of the traveling carriage which is so constructed that it can be wheeled into position with its side members situated one each side of the mounting to enable the lifting means to engage with the said pivot pins or trunnings and raise the mounting from the ground sufficiently to enable it to be angularly displaced about the said pivot pins or trunnions into a position suitable for being transported by the said traveling carriage without further lifting or manipulation, the gun or guns when in the traveling position preferably lying approximately horizontal owing to the fact that it or they have previously been fully elevated, and the base of the pedestal being approximately vertical. The mounting is detachably held in place by suitable means such as a clip which connects the gun or guns to appropriate parts of the traveling carriage and the lifting means are not disengaged from the aforesaid pivot pins or trunnions when the mounting is being transported. To bring the gun mounting from the traveling position to the firing position, the mounting is released from the traveling carriage and swung through an angle of approximately 90° upon its pivot pins or trunnions which are supported by the aforesaid lifting means and the base is then just clear of the ground. The mounting is then lowered and the traveling carriage is then wheeled clear of the mounting.

The traveling carriage preferably has a removable or pivoted rear transom connecting the side members of the frame together and the rear wheels are carried by spigots projecting from the side members so that there is no rear axle between the said side members. Thus by removing or displacing the said rear transom, the traveling carriage can be backed into a position in which the side members are situated on each side of the mounting and the lifting means can then be operated to raise the mounting as aforesaid.

In order that the said invention may be clearly understood and readily carried into effect, the same will now be described more fully with reference to the accompanying drawings, in which:—

Figure 1 is a side elevation showing a constructional form of the traveling carriage and gun mounting according to this invention with the mounting on the ground and the traveling carriage in position for enabling the mounting to be lifted from the ground.

Figure 2 is a view similar to Figure 1 showing a slightly modified form of traveling carriage with the gun mounting in the traveling position thereon, Figure 3 is a plan of Figure 2, Figure 4 is a rear elevation of Figure 2, Figure 5 is a side elevation on a smaller scale of the gun mounting in the firing position on the ground, and Figure 6 is a plan of Figure 5.

A is the gun mounting of the pedestal type attached to a firing platform consisting of a steel base $A^1$ having four radially disposed arms $A^2$, $A^2$—forming a cross when the mounting is in the firing position on the ground as shown by Figure 6, the outer ends of these arms being provided with spades for holding the mounting firmly in position on the ground. These arms are pivotally connected at $A^3$, $A^3$—to the base $A^1$ and are retained in the operative or firing position shown by Figures 5 and 6 by means of removable pins passing through holes $A^4$—in the inner ends of the arms and in the lower part of the base $A^1$. On removing these pins the arms can be swung upwards about their pivots $A^3$ into the position shown by Figure 1 and are attached by suitable devices to appropriate parts of the mounting preparatory to the latter being raised from the ground.

At each side of the mounting there is a pivot pin or trunnion $A^5$, these pivot pins or trunnions being as aforesaid situated at or near the centre of gravity of the mounting as a whole (including the gun or guns A when the latter are in the fully elevated position shown in Figure 1) and engaging with these pivot pins or trunnions are brackets $A^6$ carried by the upper ends of lifting screws $A^7$ on the traveling carriage. The said pivot pins or trunnions may be constituted by the projecting ends of a shaft passing through the side cheeks of the gun carriage (see Figure 3) or they may be separately attached to the said side cheeks. The traveling carriage is composed of side members B, B which at the front converge as shown in Figure 3 to meet at a point where they are suitably supported by the axle $B^1$ of the front wheels $B^2$, $B^2$. At the rear of the traveling carriage there is a transom $B^3$ pivoted at $B^4$ to one of the side members B so that this transom can be swung aside to enable the traveling carriage to be backed into a position in which the side members are situated one on each side of the mounting to enable the hinged parts of the brackets $A^6$ of the screws $A^7$ to be placed in position in contact with the upper surfaces of the pivot pins or trunnions $A^5$ with the lower parts of the brackets resting against the under surfaces of these pivot pins or trunnions. To provide a clear passage in backing the traveling carriage into position the rear wheels $B^5$ of the traveling carriage are carried by spigots $B^6$ projecting from the side members B so that there is no rear axle between the side members. When the traveling carriage is in the stated position which is illustrated by Figure 1 the transom $B^3$ is swung into the position shown by Figure 3 and its free end is suitably attached to the side member B opposite to that to which the transom is pivoted. The lifting screws $A^7$ which are carried one by each of the side members B are then actuated by suitable mechanism carried by the side members B in order to cause the gun mounting to be lifted from the ground. The gun mounting need only be raised from the ground a sufficient distance to enable it to be angularly displaced about the pivot pins or trunnions $A^5$ and when this has been effected the mounting is swung into the position shown by Figure 2 with the gun or guns lying approximately horizontal and at a lower level than the gun mounting itself. The guns are then connected to the traveling carriage by means of a detachable clip $A^8$ and as the brackets $A^6$ of the lifting screws $A^7$ are not disengaged from the pivot pins or trunnions $A^5$ the gun mounting as a whole is then ready for being transported by the traveling carriage. The said lifting screws are preferably so situated on the traveling carriage that when the mounting occupies its traveling position the load on the front and rear walls is approximately the same, that is to say the centre of gravity of the traveling mass is approximately midway between the front and rear wheels. This is so in the construction shown by Figures 2, 3 and 4, but in the construction according to Figure 1 the lifting screws are arranged more to the rear so that most of the weight is taken by the rear wheels $B^5$. Figure 1 also differs from Figures 2, 3 and 4 in that the side members B of the traveling carriage are bent downwards as shown so as to secure a lower traveling position for the mass.

To bring the gun mounting from the traveling position to the firing position the clip $A^8$ is removed, the mounting is swung about the pivot pins or trunnions $A^5$ until the base $A^1$ is parallel to the ground, the lifting screws $A^7$ are operated to lower the mounting so that the base $A^1$ rests on the ground, the brackets $A^6$ are detached from the pivot pins or trunnions $A^5$ and the transom $B^3$ is swung to one side. The traveling carriage can then be moved in a forward direction leaving the mounting on the ground and the arms $A^2$ are then swung down into the position shown by Figures 5 and 6 and attached to the base $A^1$ by passing the aforesaid pins through the holes $A^4$. The spades at the ends of the arms are then driven into the ground and the mounting is ready for firing.

Instead of the transom $B^3$ being pivoted it may, if desired, be made completely removable.

The mechanism for operating the screws $A^7$ preferably comprises nuts engaging with these screws and driven through suitable gearing from shafts $A^{7x}$ with squared ends for the engagement of operating spanners or crank handles.

It will be observed that by reason of these improvements, the mounting and its gun or guns can be placed in the traveling position upon the traveling carriage in a very short space of time and without its being necessary to raise the whole of the mounting more than a few inches sufficient to enable the base of the mounting to clear the ground during its movement about the aforesaid pivot pins or trunnions $A^5$, and similarly the mounting can be dismounted from the traveling carriage and placed in the firing condition in a correspondingly short space of time. It will also be seen that as the aforesaid pivot pins or trunnions are arranged at or near the centre of gravity of the mounting as a whole (including the gun or guns) the mounting can be swung about these pivot pins or trunnions with very small effort. Further, the position of the gun in relation to the traveling carriage in the traveling position, allows the centre of gravity of the equipment to be brought comparatively close to the ground, thus increasing the stability of the carriage when traveling.

The invention is particularly intended for use with the mountings of anti-aircraft guns (a mounting of this type being shown) where the capability of rapidly transporting the mountings from one position to another is of considerable importance.

What we claim and desire to secure by Letters Patent of the United States is:—

1. A gun mounting provided at approximately the centre of gravity of the mounting as a whole with means for engaging with lifting means on a traveling carriage so that after the mounting has been lifted a small distance from the ground it can be angularly displaced about its approximate centre of gravity into the transporting position on the traveling carriage without further lifting or manipulation.

2. A gun mounting provided at approximately the centre of gravity of the mounting as a whole with trunnions for engaging with lifting means on the traveling carriage so that after the mounting has been lifted a small distance from the ground it can be angularly displaced about its approximate centre of gravity into the transporting position on the traveling carriage without further lifting or manipulation.

3. A traveling carriage for a gun mounting, comprising side members which by manœuvring the carriage can be brought into a position on each side of the mounting, and lifting means on said carriage for engaging with the gun mounting at approximately the centre of gravity of the mounting as a whole and raising the mounting from the ground sufficiently to enable it to be angularly displaced about the approximate centre of gravity into the transporting position on the carriage without further lifting or manipulation.

4. A traveling carriage for a gun mounting, comprising side members which by manœuvring the carriage can be brought into a position on each side of the mounting, and lifting screws on said side members for engaging with the gun mounting at approximately the centre of gravity of the mounting as a whole and raising the mounting from the ground sufficiently to enable it to be angularly displaced about the approximate centre of gravity into the transporting position on the carriage without further lifting or manipulation.

5. A traveling carriage for a gun mounting, comprising side members which by manœuvring the carriage can be brought into a position on each side of the mounting, and lifting devices on said side members for engaging with trunnions arranged on the gun mounting at approximately the centre of gravity of the mounting as a whole and raising the mounting from the ground sufficiently to enable it to be angularly displaced about the approximate centre of gravity into the transporting position on the carriage without further lifting or manipulation.

6. A traveling carriage for a gun mounting, comprising side members which by manœuvring the carriage can be brought into a position on each side of the mounting, a displaceable transom at the rear parts of said side members, spigots projecting outwardly from said side members, said spigots supporting the rear wheels of the carriage, and lifting means on said carriage for engaging with the gun mounting at approximately the centre of gravity of the mounting as a whole and raising the mounting from the ground sufficiently to enable it to be angularly displaced about the approximate centre of gravity into the transporting position on the carriage without further lifting or manipulation.

7. A traveling carriage for a gun mounting, comprising side members which by manœuvring the carriage can be brought into a position on each side of the mounting, a pivoted transom normally connecting the rear parts of said side members together, spigots projecting outwardly from said side members, said spigots supporting the rear wheels of the carriage, and lifting means on said carriage for engaging with the gun mounting at approximately the centre of gravity of the mounting as a whole and raising the mounting from the ground sufficiently to enable it to be angularly displaced about the approximate centre of gravity into the transporting position on the carriage without further lifting or manipulation.

8. In a pedestal gun mounting, the combination of a base, a plurality of supporting arms pivoted thereto, means for detachably connecting said arms to said base when they are in the horizontal position, means which permit said arms to be raised to a substantially vertical position, and means for detachably connecting said arms to the mounting when they are in the raised position.

ARTHUR TREVOR DAWSON.
GEORGE THOMAS BUCKHAM.